United States Patent [19]

Kobayashi et al.

[11] Patent Number: 4,932,097
[45] Date of Patent: Jun. 12, 1990

[54] WIPER ARM

[75] Inventors: Kyoji Kobayashi; Yuji Hirohama, both of Kanagawa, Japan

[73] Assignee: Jidosha Denki Kogyo Kabushiki Kaisha, Kanagawa, Japan

[21] Appl. No.: 207,553

[22] Filed: Jun. 16, 1988

[30] Foreign Application Priority Data

Jun. 16, 1987 [JP] Japan .................. 62-91316[U]

[51] Int. Cl.$^5$ ............................................. B60S 1/34
[52] U.S. Cl. ................................................ 15/250.34
[58] Field of Search .......... 15/250.31, 250.32, 250.34, 15/250.35, 250.2, 250.36, 250.37, 250.38, 250.39, 250.4, 250.41, 250.42; 403/78, 79, 151, 150, 153, 154, 155, 156, 161, 162, 163; 384/297, 300, 908, 909, 912, 913, 275, 276, 277, 282, 296, 299

[56] References Cited

U.S. PATENT DOCUMENTS

| | | | |
|---|---|---|---|
| 3,022,531 | 2/1962 | Scinta | 15/250.35 |
| 3,188,679 | 6/1965 | Wubbe | 15/250.35 |
| 3,193,335 | 7/1965 | Wing | 384/296 |
| 4,015,949 | 4/1977 | Baker et al. | 384/909 X |
| 4,189,194 | 2/1980 | Davies | 384/909 X |
| 4,286,351 | 9/1981 | Mower et al. | 15/250.32 X |
| 4,308,153 | 12/1981 | Mori | 384/912 X |
| 4,418,441 | 12/1983 | Van Den Berg | 15/250.32 X |
| 4,582,368 | 4/1986 | Fujita et al. | 384/912 X |
| 4,608,085 | 8/1986 | Eudier et al. | 384/912 X |
| 4,666,787 | 5/1987 | Bickle et al. | 384/912 X |

FOREIGN PATENT DOCUMENTS

| | | | |
|---|---|---|---|
| 1486324 | 6/1967 | France | 15/250.32 |
| 1495314 | 9/1967 | France | 15/250.32 |
| 821954 | 10/1959 | United Kingdom | 384/908 |
| 857832 | 1/1961 | United Kingdom | 384/908 |
| 1180177 | 2/1970 | United Kingdom | 15/250.35 |
| 1183446 | 3/1970 | United Kingdom | 15/250.42 |

OTHER PUBLICATIONS

Happoldt, Jr., Dr. W. B., "Bearings of DuPont Teflon Offer Low Coefficient of Friction, Are Self-Lubricating", Automotive Industries Sep. 1954, pp. 107, 108.

Primary Examiner—Harvey C. Hornsby
Assistant Examiner—Scott J. Haugland
Attorney, Agent, or Firm—Sughrue, Mion, Zinn, Macpeak & Seas

[57] ABSTRACT

A wiper arm is provided with a resinous intermediate member between a retainer made from an iron-based alloy and an arm head die cast from an aluminum alloy. The wiper arm is free from electrochemical corrosion because the retainer and the arm head are not in contact with each other due to said resinous intermediate member disposed therebetween.

3 Claims, 7 Drawing Sheets

FIG. 9 *(PRIOR ART)*
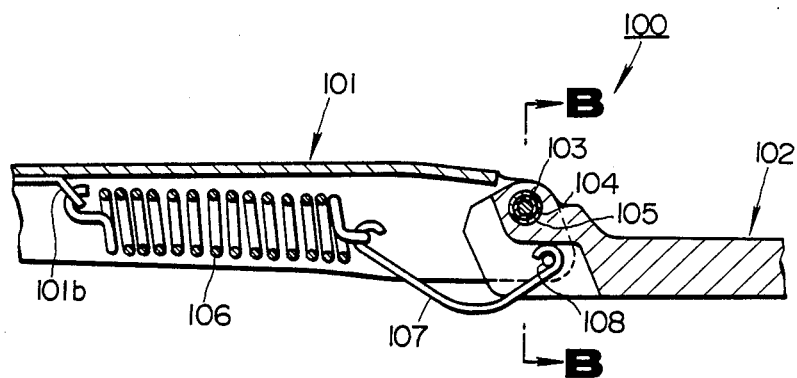
FIG. 10 *(PRIOR ART)*
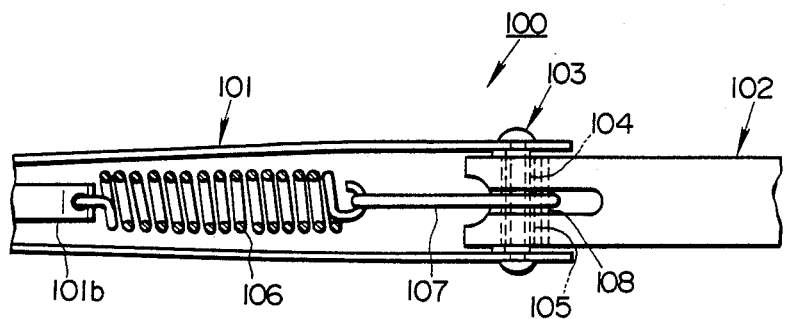

FIG.11 *(PRIOR ART)*
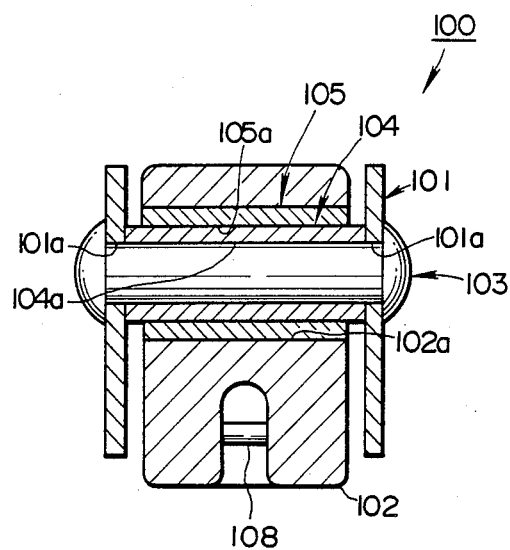

WIPER ARM

BACKGROUND OF THE INVENTION

1. Field Of The Invention

This invention relates to a structure for a wiper arm used for an electric windshield wiper to wipe a windshield of an automobile or the like with a wiper blade.

2. Description Of The Prior Art

The prior art wiper arm 100 shown in FIGS. 9-11 includes a connecting portion comprised of retainer 101 made of stainless steel for fixing a wiper blade and an arm head 102 made of ADC material (Aluminum alloy die casting) adapted to be connected with a wiper motor. In the Figures, numeral 103 designates a connecting pin, numeral 104 designates a metallic collar and numeral 105 designates a metallic bushing. As shown in FIG. 11, the cylindrical bushing 105 is fitted into an opening 102a bored in the arm head 102 and the cylindrical collar 104 is inserted into a hollow portion 105a of said bushing 105, the retainer 101 is in contact with right and left ends of said collar 104 as shown in the Figures and the connecting pin 103 extends through the opening 101a bored in the retainer 101 and a hollow portion 104a of the collar 104, and then the retainer 101 is connected movably with the arm head 102 by flattening the protruding portion of the connecting pin 103 out of the retainer 101.

Numeral 106 designates a tension spring, which is hooked in a holder 101b equipped on the retainer 101 at the end of left side thereof in FIG. 9 and hooked on a roller pin 108 attached to the arm head 102 through a hook 107 at the end of the right side thereof which energizes the retainer 101 counterclockwise relative to the arm head 102 in FIG. 9.

However, in the conventional wiper arm 100 as described above, because it has a structure wherein the metallic bushing 105 is fitted into the arm head 102 made of ADC material, and the metallic collar 104 is inserted into the bushing 105 with the retainer made of stainless steel making contact with both ends of said collar 104, an electrochemical cell (a local cell) is formed between arm head 102 and retainer 101 and an electric current flows through the collar 104 and the bushing 105. Consequently, electrochemical corrosion sometimes occurs in the arm head 102 and retainer 101, so that there is a problem that it spoils the beauty of the wiper arm 100.

SUMMARY OF THE INVENTION

Therefore, since this invention is considered in order to solve the aforementioned problem of the prior art, it is an object to provide a wiper arm free from electrochemical corrosion of the arm head and the retainer.

The construction of the wiper arm according to this invention for accomplishing the above-mentioned object comprises a wiper arm provided with a retainer for fixing a wiper blade movably to an arm head adapted to be connected with a wiper motor, characterized in that said retainer is insulated from said arm head by an intermediate member which is provided with a slider portion in sliding contact with said retainer and a fitting portion fitted into said arm head.

BRIEF DESCRIPTION OF THE DRAWINGS

FIG. 9 is a longitudinal sectional side view at the connection portion of the retainer and the arm head of a conventional wiper arm;

FIG. 10 is a bottom view of the wiper arm shown in FIG. 9; and

FIG. 11 is a sectional view along section lines B—B of the wiper arm shown in FIG. 9.

DESCRIPTION OF THE PREFERRED EMBODIMENTS

Figure 1:
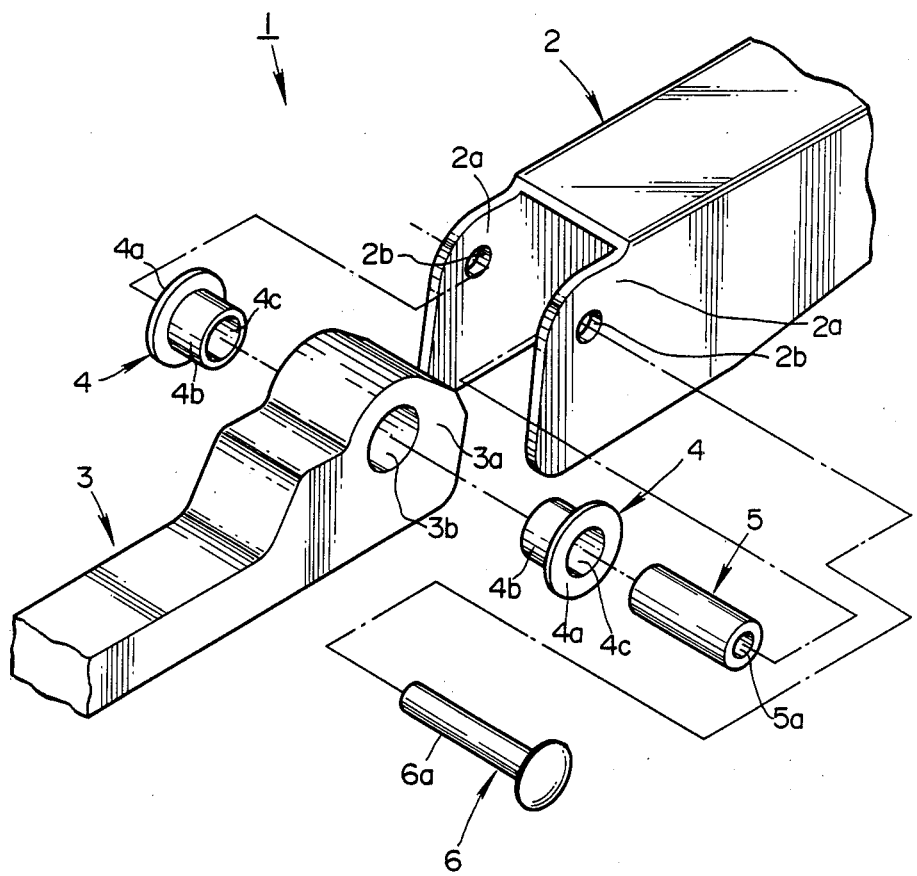
FIG. 1 is a perspective outside view of respective members at the connecting portion of the retainer and the arm head of the wiper arm according to an embodiment of this invention.

An embodiment of the wiper arm according to this invention will be described below on basis of FIGS. 1 to 4.

In a wiper arm 1 shown in the Figures, a connecting portion of a retainer 2 for fixing a wiper blade (not shown) with an arm head 3 adapted to be connected with a wiper motor (not shown) is shown.

Namely, the wiper arm 1 comprises mainly the retainer 2, the arm head 3, two intermediate members 4 set between said retainer 2 and said arm head 3 in this embodiment, a sleeve 5 and connecting pin 6.

Figure 2:
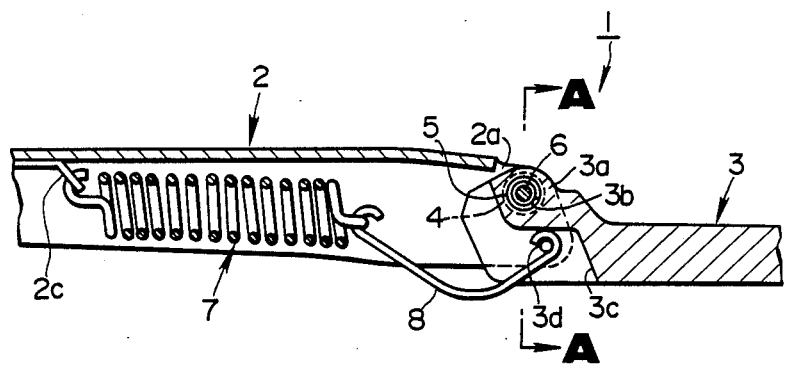
FIG. 2 is a longitudinal sectional side view at the connecting portion of the retainer and the arm head of the wiper arm according to an embodiment of this invention.
Figure 3:
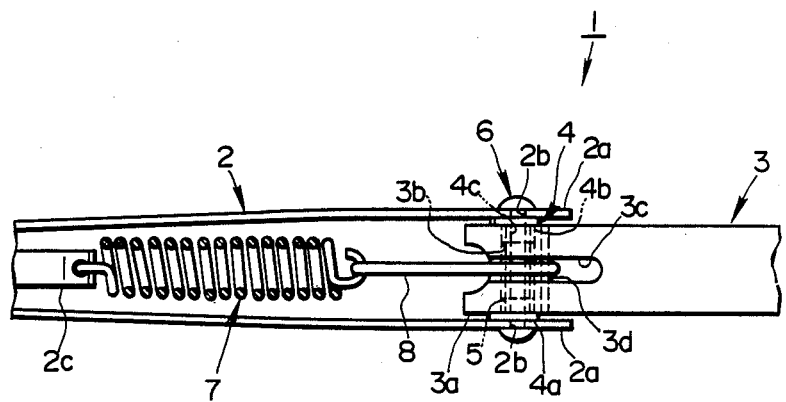
FIG. 3 is a bottom view of the wiper arm shown in FIG. 2.

The retainer 2, made of stainless steel, is provided with parallel plate-like connecting parts 2a at the position near to the end thereof on the right side in FIGS. 2 and 3, said connecting parts 2a are provided with piercing openings 2b respectively.

The arm head 3, made of ADC material, is provided with a piercing opening 3b in the up-and-down direction in FIG. 3 at the connecting part 3a near to the end thereof on the left side in FIG. 2, and said connecting part 3a is attached with a roller pin 3d in the notch 3c at the lower side thereof in FIG. 2.

Figure 4:
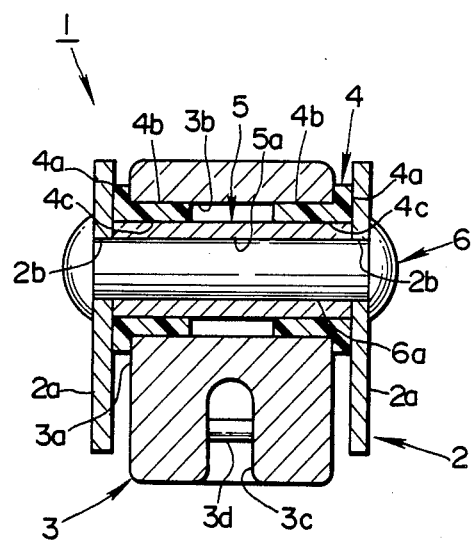
FIG. 4 is a sectional view along section lines A—A of the wiper arm shown in FIG. 2.

Each intermediate member 4 is formed with insulating resin such as PPS (Polyphenylene sulfide), for example, in this embodiment and has a discoidal slider portion 4a having a large diameter disposed in sliding contact with the connecting part 2a of the retainer 2 and a fitting portion 4b having a diameter smaller than that of said slider portion 45a fitted into the opening 3b in the connecting part 3a of the arm head 3, and a hollow portion 4c piercing said slider portion 4a and fitting portion 4b in the center thereof. The length of said fitting portion 4b in the lateral direction in FIG. 4 is shorter than half the depth of the opening 3b bored in the arm head 3.

The collar 5 is cylindrical shape having a hollow portion 5a in the center thereof, the outside diameter is slightly smaller than the hollow portion 4c of the intermediate member 4, and the longitudinal length is slightly shorter than the distance between plate-like connecting parts 2a of the retainer 2.

The connecting pin 6 is a rivet, the outside diameter of the shaft 6a being slightly smaller than the inside diameter of the opening 2h bored in the connecting part 2a of the retainer 2 and the inside diameter of the hollow portion 5a of the collar 5.

In the drawings numeral 7 is a tension spring, which is hooked in a holder 2c equipped on the retainer 2 at the end of left side thereof in FIG. 2 and hooked on a roller pin 3d attached to the arm head 3 through a hook 8 at the end of right side thereof to bias the retainer 2 counterclockwise against the arm head 3 in FIG. 2.

As shown in FIG. 4, the fitting portion 4b of each intermediate member 4 is fitted into the opening 3d bored in the connecting part 3a of the arm head 3 and the collar 5 is inserted into the hollow portion 4c of each intermediate member 4. The ends of the right and left sides of the intermediate member 4 have slider portions 4a held in position between arm head 3 and retainer 2 in contact with connecting parts 2a of the retainer 2. The ends of the right and left sides of the collar 5 in the Figure also contact with connecting parts 2a of the retainer 2. The connecting pin 6 pierces through the hollow portion 5a of the collar 5 from the opening 2b on one side board in the connecting part 2a of the retainer 2 to the opening 2b on another side bored in the connecting part 2a of the retainer 2 and is flattened at its outside portion over the retainer 2.

Namely, the retainer 2 and the arm head 3 are in the isolated state with the intermediate member 4 set between retainer 2 and arm head 3. Therefore it is possible to prevent electrochemical corrosion because they are not in contact with each other.

Figure 5:
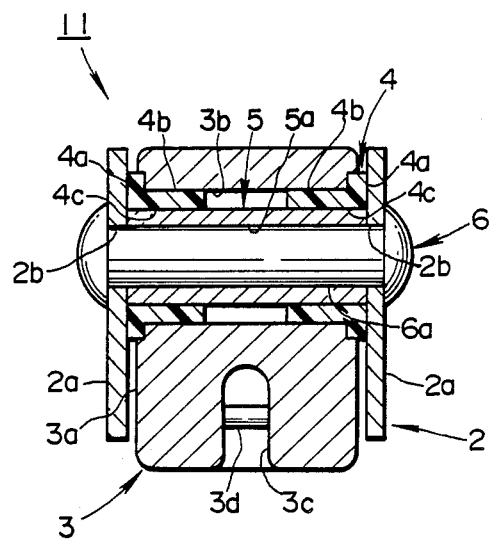
FIG. 5 is a transverse sectional view at the connecting portion of the retainer and the arm head of the wiper arm according to another embodiment of this invention.

In FIG. 5 the wiper arm 11 in this embodiment has intermediate members 4 embedded in the connecting parts 3a of the arm head 3 up to the middle of the slider portion 4a of the intermediate member 4.

Figure 6:
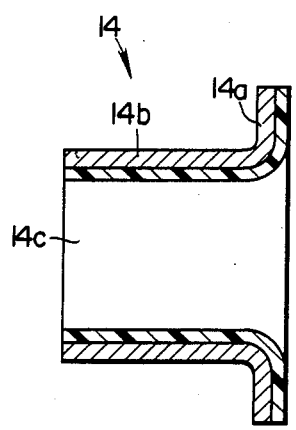
FIGS. 6-8 are sectional views of intermediate members to be used for wiper arms according to other embodiments of this invention.
Figure 7:
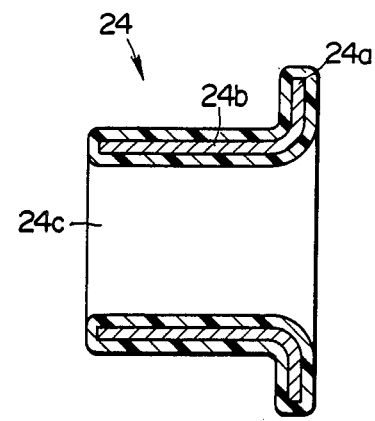
Figure 8:
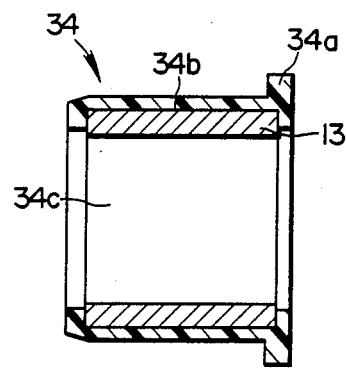

Numerals 14, 24 and 34 shown in FIGS. 6–8 are intermediate members to be used for wiper arms according to other embodiments of this invention.

Namely, an intermediate member 14 is formed by coating PTFE (Polytetrafluoroethylene) on the inner peripheral wall of a metallic base member, provided with a slider portion 14a, fitting portion 14b and a hollow portion 14c in the center thereof in the same manner as said intermediate member 4.

An intermediate member 24 is formed by coating PTFE around a metallic base member which is also provided with a slider portion 24a, a fitting portion 24b and a hollow portion 24c as said intermediate member 14.

In FIG. 8, numeral 13 is a tubular oilless bearing and an intermediate member 34 is composed of said oilless bearing 13 and insulating resin such as PPS (Polyphenylene sulfide) for example, covering the outer periphery of said oilless bearing 13. The intermediate member 34 also has a slider portion 34a for sliding contact with the connecting part of the retainer and a fitting portion 34b for insertion into the opening of the arm head and a hollow portion 34c for receiving the collar.

Said intermediate members 14, 24 and 34 may be applied to wiper arms in the same manner as the embodiment described above.

PTFE (Polytetrafluoroethylene) is small in its coefficient of friction and shows excellent thermal and chemical resistance and insulating properties.

An oilless bearing made of oil impregnated sintered metal exhibits a sufficient lubricating ability without supplying lubricating oil and PPS (Polyphenylene sulfide) shows excellent thermal and chemical resistance and insulating properties.

Therefore, the wiper arms using these intermediate members 14, 24 and 34 are not only free from electrochemical corrosion but are also superior in workability and durability.

As mentioned above, the wiper arm according to this invention has structure wherein the wiper arm is attached to a retainer for fixing a wiper blade movably to an arm head connected with a wiper motor, said retainer being insulated from said arm head by an intermediate member which is provided with a slider portion disposed in sliding contact with said retainer and a fitting portion fitted into said arm head.

Therefore an excellent effect is obtained whereby electrochemical corrosion does not occur unlike in the conventional wiper arm and the beauty of the wiper arm is never spoiled.

What is claimed is:

1. A wiper arm assembly comprising a die-cast arm head of an aluminum alloy adapted to be driven by a wiper motor, a retainer made from an iron-based alloy adapted to support a wiper blade thereon and pivot means for pivotally connecting said retainer to said arm head, said pivot means comprising a pivot pin extending through aligned apertures in said arm head and said retainer and insulating means having a tubular portion surrounding said pivot pin between said pivot pin and said arm head and an annular flange portion on said tubular portion interposed between said arm head and said retainer,
   wherein said insulating means is comprised of a metallic member having a coating of polytetrafluoroethylene on an inner surface of said tubular portion and an outer surface of said flange portion facing said retainer.

2. A wiper arm assembly comprising a die-cast arm head of an aluminum alloy adapted to be driven by a wiper motor, a retainer made from an iron-based alloy adapted to support a wiper blade thereon and pivot means for pivotally connecting said retainer to said arm head, said pivot means comprising a pivot pin extending through aligned apertures in said arm head and said retainer and insulating means having a tubular portion surrounding said pivot pin between said pivot pin and said arm head and an annular flange portion on said tubular portion interposed between said arm head and said retainer,
   wherein said insulating means is comprised of a tubular metal oilless bearing member and an insulating resin covering the outer periphery of said bearing member.

3. A wiper arm assembly as set forth in claim 2, wherein said insulating resin is polyphenylene sulfide.

* * * * *